Dec. 24, 1940.   J. E. HAINES ET AL   2,225,956
CONTROL APPARATUS
Filed March 13, 1939
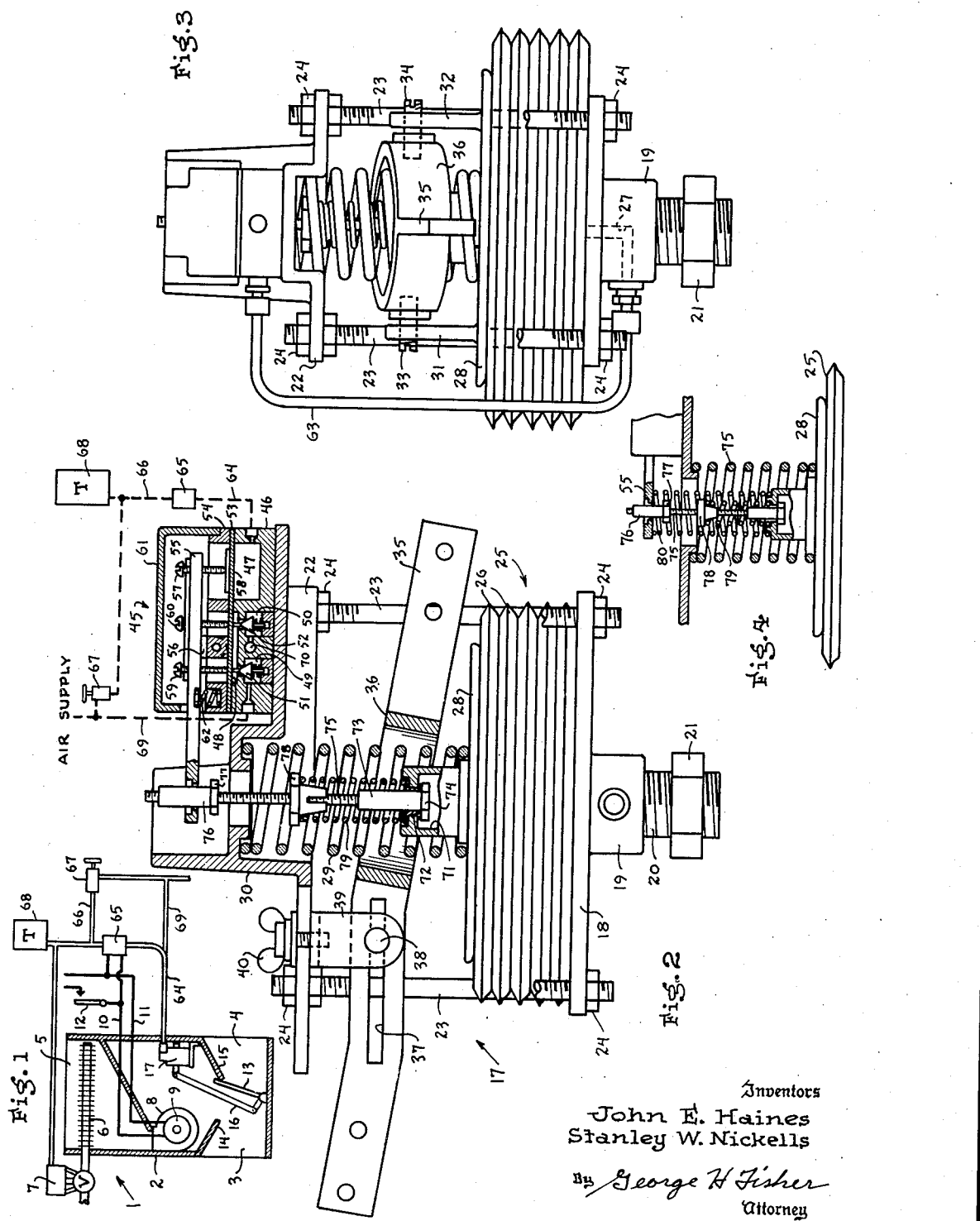
Inventors
John E. Haines
Stanley W. Nickells
By George H Fisher
Attorney Patented Dec. 24, 1940

2,225,956

UNITED STATES PATENT OFFICE 2,225,956

CONTROL APPARATUS

John E. Haines and Stanley W. Nickells, Chicago, Ill., assignors to Minneapolis-Honeywell Regulator Company, Minneapolis, Minn., a corporation of Delaware Application March 13, 1939, Serial No. 261,673

15 Claims. (Cl. 236—38)

In the air conditioning art, it has become common to heat spaces or enclosures by devices known as unit ventilators. This type of device consists of a casing located at the space to be heated and which contains a heating element and a fan for forcing air to flow through the heating element. This type of device is also provided with fresh air and recirculated air inlets and a damper for varying the proportions of fresh and recirculated air which is passed through the heater and to the space. It has become common to control these unit ventilators automatically, this automatic control being accomplished by controlling the fresh air damper and the valve or by-pass damper for the heater in accordance with a predetermined sequence to obtain the desired results. When pneumatic controls are used, it is customary to utilize two pneumatic motors for accomplishing the control, one motor being provided for actuating the valve for the heater and the other for actuating the fresh and recirculated air damper. These two motors are controlled by a single thermostat and each consists of a diaphragm connected so that the pressure therein is graduated by the thermostat, these diaphragms being biased by means of springs. By providing springs of different characteristics, the desired sequence in control of the valve and damper is obtained.

Heretofore, a certain amount of difficulty has been experienced with arrangements of this type. One source of trouble is due to the non-positive control action of the pneumatic motor which relies upon the spring tension balancing the applied pressure for maintaining the damper in the proper position. With this type of control, the power for moving the damper to the proper position approaches zero as the damper approaches the proper position. This requires that there be no friction or binding in the damper mechanism in order to obtain satisfactory results. However, it often happens that after a unit has been in use, the damper bearings become sticky which causes the control to become erratic. Also, in some instances, the unit ventilator is distorted during installation which causes the damper to bind. A further difficulty encountered is due to the tension of the damper motor spring changing after the unit ventilator has been in use for a considerable period of time, which causes operation of the damper and valve in an improper sequence. Another difficulty experienced with this type of control is that a number of different control sequences are now in use, different manufacturers of unit ventilators desiring different sequences of control. This necessitates the designing of different damper motors and valves having the proper springs for obtaining the different control sequences, all of which are similar in appearance and are easily confused.

Also, in unit ventilator control practice, it is often desired to cause the damper to close off the supply of fresh air when the space is cold or unoccupied while providing a minimum supply of fresh air when the space is occupied or its temperature is normal, and gradually increasing the fresh air supply as the space becomes overheated and requires cooling. This requires the provision of an additional spring on the damper motor for obtaining the hesitation action of the damper at the minimum position, and this additional spring must be available with different characteristics for different control sequences, thus further increasing the number of parts which must be kept in stock.

It is an object of this invention to provide a pneumatic control arrangement for air conditioning apparatus of this nature which controls the damper or other device positively for causing it to assume the proper position irrespective of friction or other conditions, and which can be readily adjusted for providing a plurality of different sequences thereby permitting the same type of motor to be used for controlling a large number of different types of apparatus.

A further object of this invention is the provision of a pneumatic control arrangement for unit ventilators and similar apparatus which provides for positive control of the actuating motor and which also provides a hesitating or step action.

Another object is the provision of a pneumatic control unit for air conditioning apparatus which consists of a motor having a lever arm with a pivot point adjustable longitudinally of the lever arm for thereby varying the degree of movement of the controlled device for a given movement of the motor diaphragm, this providing a differential adjustment and also rendering the unit capable of installation in a large number of different types and makes of apparatus, without modification.

While the various features of this invention are of especial utility for air conditioning control, certain features are of broader application. Other objects of this invention will appear from the following description and the appended claims.

For a full disclosure of this invention, reference is made to the following description and to the accompanying drawing in which Figure 1 illustrates diagrammatically a unit ventilator having the damper control apparatus of this invention applied thereto;

Figure 2 is a side view partly in section of the damper motor and the positive positioner;

Figure 3 is an elevation of the motor and positioner, and

Figure 4 is a fragmentary view of a modification.

Referring to Figure 1, reference character 1 indicates diagrammatically a unit ventilator having a casing 2 formed to provide a recirculated air inlet 3, a fresh air inlet 4, and an outlet 5. This unit ventilator includes the usual heating coil 6, the flow of steam to which is controlled by a pneumatic valve 7 of usual construction. This device also includes a fan 8 which is driven by a motor 9, this fan serving to draw air through the inlets 3 and 4, passing it over the heater 6 and discharging it through opening 5 into the space being heated. The fan motor 9 is provided with line wires 10 and 11, the wire 10 having a switch 12 interposed therein for placing the fan into and out of operation. The unit ventilator 1 is also provided with a damper 13 which cooperates with partitions 14 and 15 for controlling the proportions of fresh and recirculated air passed through the unit. It will be apparent that when damper 13 engages partition 15, all recirculated air will be supplied to the device while when the damper 13 engages partition 14 all fresh air will be supplied. For intermediate positions of the damper 13, a mixture of fresh and recirculated air will be supplied. The damper 13 is actuated through a link 16 by means of a damper motor 17.

Referring now to Figure 2, the damper motor 17 comprises a base plate 18 having a boss 19 formed integrally therewith, this boss receiving a stud 20 having a nut 21 for mounting the base plate upon a suitable bracket in the unit ventilator. The damper motor 17 also includes a top plate 22 which is supported in spaced relationship with the base plate 18 by means of threaded rods 23 having suitable nuts 24.

Mounted upon the base plate 18 is a diaphragm structure 25 which consists of a plurality of separate cells 26 which are secured together in communicating relationship in a manner well known in the art. The lowermost diaphragm is provided with a connection with an air passage 27 formed in the boss 19 (Figure 2). Mounted upon the uppermost cell 26 is a plate 28 upon which rests a spring 29, the upper end of which is received in a depressed portion 30 of the top plate 22. The pressure plate 28 is also provided with integral standards 31 and 32 which are provided with bolts or studs 33 and 34 forming a pivot for a lever arm 35. This lever arm is provided with a circular portion 36 which surrounds the spring 29 and which receives the bolts 33 and 34. The lever arm 35 is also provided with a slot 37 receiving a pin 38 which is carried by a bracket 39. This bracket is secured to the top plate 22 by means of a wing bolt 40. This bolt is received in a slot in the top plate 22 which is parallel with the lever arm 35, this permitting the position of the bracket 39 to be readily adjusted longitudinally of the lever arm 35. From the description thus far, it should be apparent that the diaphragm 25 is biased by means of the spring 29, this diaphraghm and spring serving to rotate the lever arm 35 about the pivot pin 38. It should also be apparent that by adjusting the position of bracket 39, the degree of rotation of lever arm 35 about its pivot 38 for a given movement of diaphragm 25 may readily be varied.

Referring now to the positive positioner 45, this device includes a base member 46 which is formed to provide a diaphragm chamber 47, a valve chamber 48, and valve bores 49 and 50. The valve bores 49 and 50 are provided with valve ports communicating with the valve chamber 48, these valve ports being provided with valve members 51 and 52 having stem portions which extend through the valve ports into engagement with a diaphragm 53 which also covers the diaphragm chamber 47. The valve members 51 and 52 are also provided with suitable springs which urge these members towards closed position.

The diaphragm 53 is held in place by a cover plate 54 having openings therein coinciding with the diaphragm chamber 47 and the valve chamber 48. Reference character 55 indicates a valve lever having an extension 56 which is pivoted to the cover plate 54 midway between the valves 51 and 52. This valve lever is provided with an abutment screw 57 which engages the portion 58 of the diaphragm which covers the diaphragm chamber 47. This valve lever is also provided with abutment screws 59 and 60 which engage the diaphragm 53 adjacent the valves 51 and 52, respectively. These screws 59 and 60 are adjusted so that when the valve lever 55 is in the intermediate position shown, the valve members 51 and 52 will both engage their respective seats. However, if the valve lever 55 is rocked clockwise from the neutral position the valve member 52 will open, and conversely, if the valve lever is rocked counter-clockwise from the neutral position the valve member 51 will open. The valve lever 55 is covered by means of a cover 61. A spring 62 is interposed between the cover plate 54 and the valve lever 55 and serves to bias this valve lever in the direction for urging the valve member 52 towards open position.

The valve chamber 48 is connected by a pipe 63 (Figure 2) to the passage 27 in the boss 19 and therefore the valve chamber 48 is in communication with the interior of the diaphragm structure 25. The diaphragm chamber 47 is connected to a pipe 64 which in turn is connected to an electric pneumatic relay 65 which is connected to pipe 66 leading from a restriction 67 connected to an air supply line. This pipe 66 is also connected to a thermostat 68 which serves to vary the pressure in pipe 66 in a manner well understood in the art. The pressure applied to the diaphragm chamber 47 is therefore controlled by the thermostat 68 and also by the electric pneumatic switch 65. The valve bore 49 is connected to a pipe 69 which leads from the source of air supply. The valve 51 is therefore an air supply valve. The valve bore 50 is connected to a vent passage 70 and thus the valve 52 is a vent valve for venting air from the diaphragm structure 25.

Mounted upon the pressure plate 28 within the spring 29 is a hollow cylindrical abutment member 71 having an opening 72 which receives a sleeve 73, this sleeve having a head portion 74 which engages the upper wall of member 71. The sleeve 73 receives a plunger screw 75 which extends upwardly and supports a sleeve 76 which extends through an opening in the valve lever 55, this sleeve having a head portion 77 for lifting this valve lever. The plunger screw 75 also carries a nut 78 which serves to adjust the intial tension of a follow-up spring 79.

Referring again to Figure 1, it will be noted that the thermostat 68 in addition to controlling the pressure applied to the diaphragm chamber 47 of the positive positioner also controls the pressure applied to the valve 7. This thermostat is of the direct acting type which acts to increase the pressure in pipe 66 upon rise in temperature. This thermostat may be adjusted in a manner so as to prevent the pressure in pipe 66 from falling below three pounds per square inch and to reduce the pressure to this value when the space temperature falls to 68° F. This thermostat may also be set so that when the space temperature rises to 70° F. the pressure in pipe 66 is increased to fifteen pounds per square inch. The valve 7 may be arranged so as to be wide open when the air pressure applied thereto is decreased to three pounds per square inch while being entirely closed when the air pressure is raised to seven pounds per square inch. It should be noted that the electric pneumatic relay 65 is connected in parallel with the fan motor 9 so that when the fan motor 9 is operating, this relay is energized. At this time, the relay 65 will place the pipes 66 and 64 in communication so that the thermostat 68 controls the pressure applied to the diaphragm chamber 47 of the positive positioner. When, however, the fan is out of operation, the relay 65 is deenergized which acts to vent the diaphragm chamber 47 irrespective of the action of thermostat 68.

Operation

Assuming first that the switch 12 is open as shown, the fan 9 and the relay 65 will be deenergized. This deenergization of relay 65 will vent the diaphragm chamber 47. This will permit the spring 62 of the positive positioner to rock the valve lever 55 clockwise thereby opening the vent valve 52 which permits all the air in diaphragm 25 to escape. This permits the spring 29 to collapse this diaphragm and rotate the lever arm 35 clockwise about its pivot 38 which causes the damper 13 to engage the partition 15 for completely shutting off the flow of fresh air. At this time, the thermostat 68 can still control the valve 7 so as to open this valve when the space temperature falls to a value wherein the pressure in pipe 66 is reduced below seven pounds per square inch.

Now assuming that the space temperature is such that thermostat 68 reduces the pressure in pipe 66 to three pounds per square inch and that the switch 12 is closed for placing the fan in operation, the relay 65 will be energized for causing this three pounds per square inch to be applied to the diaphragm chamber 47. This pressure will overcome the spring 62 and rock the valve lever 55 counter-clockwise for opening the air supply valve 51. At this time it should be noted the valve lever 55 does not engage the head portion 77 of the sleeve 76. Due to opening of the supply valve 51, air under pressure will be passed into the diaphragm 25 thereby causing it to expand against the action of spring 29 which moves the damper 13 in the direction for admitting fresh air to the unit ventilator. As the diaphragm 25 expands in this manner, the member 71 rises and carries with it the assembly including the follow-up spring 79, the plunger screw 75, and the sleeves 73 and 76. When the damper opens in this manner to the predetermined minimum position, the head 77 of the sleeve 76 will engage valve lever 55 and thus rock this lever clockwise for closing the supply valve 51. This will stop further expansion of the diaphragm 25 and thus the damper will remain at this minimum position. At this time, the valve 7 will be wide open for supplying a maximum amount of heat to the space.

As the space becomes heated above 68° F., the thermostat 68 will begin raising the pressure applied to valve 7 and diaphragm chamber 47 which will cause the valve 7 to begin closing. This increase in pressure applied to diaphragm chamber 47 will tend to rotate the valve lever 55 counter-clockwise for opening the supply valve 51. However, at this time the tension of the follow-up spring 79 is sufficient to prevent the plunger screw 75 from being urged downwardly and this prevents such rocking of the valve lever 55. Therefore even though the thermostat 68 is increasing the pressure applied to the valve 7 for closing this valve, the damper 13 remains stationary. When the space temperature rises to 68.5° F. the pressure in pipe 66 will be raised by the thermostat 68 to seven pounds per square inch and consequently the valve 7 will be completely closed.

The nut 78 is adjusted on the plunger screw 75 so that the tension of the follow-up spring 79 is overcome when the pressure applied to diaphragm chamber 47 rises to nine pounds per square inch. When the pressure is raised to this value by the thermostat 68, due to further rise in temperature, the valve lever 55 will be urged counter-clockwise against the action of springs 62 and 79 for opening the supply valve 51 which supplies additional air under pressure to the diaphragm 25. This causes further expansion of diaphragm 25 against the action of spring 29. This causes rotation of damper 13 in a direction for increasing the supply of fresh air to the space which provides for cooling down the space. As the diaphragm 25 expands from this point, the head 74 of the sleeve 73 will disengage the inner wall of member 71 and the tension of the follow-up spring will be increased in proportion to the expansion movement of diaphragm 25. This increase in tension of the spring 79 urges the valve lever 55 back to the neutral position wherein the supply valve 51 is closed, this action occurring when the combined action of springs 79 and 62 just balances the pressure applied to diaphragm chamber 47. It will be apparent that as the temperature rises further, this process will be repeated, the valve lever 55 each time being returned to the neutral position when the opening of the damper 13 just corresponds to the pressure applied to the diaphragm chamber 47 by the thermostat 68.

Upon fall in temperature within the space, the thermostat 68 will decrease the pressure applied to the chamber 47 which will then permit the combined action of springs 79 and 62 to rock the valve lever 55 clockwise for opening the vent valve 52 which permits contraction of the diaphragm 25 and movement of the damper 13 for reducing the supply of fresh air. As the diaphragm contracts, the tension of spring 79 will be decreased which serves to return the valve lever to the neutral position for closing the vent valve 52 when the damper position just corresponds to the reduced applied pressure. This action may occur until the damper is returned to its minimum position but when this occurs the head 74 will reengage the upper wall surface of member 71 and thus prevent further expansion of the follow-up spring 79. This will occur when the thermostat has reduced the applied pressure to nine pounds per square inch. Upon further drop in space temperaure the pressure applied to the diaphragm chamber 47 and the valve 7 will be reduced. However, as spring 79 can no longer urge the valve lever 55 clockwise, this valve lever will remain stationary and consequently the damper will remain stationary at the minimum position. Now as the space temperature falls further, the valve 7 will begin opening for adding heat to the air being passed to the space.

While for purposes of description, a specific cycle of operation has been described and definite values of temperature and pressure have been mentioned, it is to be understood that the application of our improved regulator is not limited to the cycle just described and that it may be used with a large number of other cycles requiring different temperature and pressure values. For example, certain cycles of operation do not require the maintaining of the fresh air damper at the minimum position at all times that the valve is in operation. In such event, the electric pneumatic relay may be omitted and the thermostat 68 may be arranged so as to reduce the pressure applied to the diaphragm chamber 47 to zero when the space temperature falls to a minimum value. This arrangement would act to cause the fresh air damper to be closed when the space temperature is low while opening the damper to a minimum upon an initial rise in space temperature, then closing the steam valve while the damper remains stationary and finally opening the damper for increasing the flow of fresh air upon continued rise in temperature.

It will be noted that adjustment of the sleeve 76 upon the plunger screw 75 determines the degree of opening for the minimum position and that adjustment of the nut 78 upon the plunger screw serves to determine the initial tension of the follow-up spring 79 and thus determines the minimum pressure at which the damper is opened beyond the minimum position. Also by adjusting the position of the bracket 39 the degree of movement of the damper for a given change in pressure by the thermostat may readily be varied. This adjustment of the bracket 39 also renders the motor capable of being applied to a variety of different makes and sizes of unit ventilators.

For some cycles of operation it may be desired to modulate the damper to the minimum position instead of causing the damper to travel immediately from the closed position to the intermediate position. In such event, the arrangement may be modified by omitting the spring 62 and substituting a spring 80 as shown in Figure 4. This spring 80 may surround the follow-up spring 79 and serves to bias the valve lever 55 clockwise. With this arrangement it will be noted that as the pressure applied to the diaphragm chamber 47 is increased from zero, the valve lever 55 will first be rocked against the action of the follow-up spring 80, this admitting air under pressure to the diaphragm 25. This causes the tension of spring 80 to be increased for rocking the valve lever 55 back to the neutral position when the expansion movement of the diaphragm 25 corresponds to the pressure applied to the diaphragm chamber 47. This action will occur until the diaphragm 25 expands sufficiently for causing the head 77 of sleeve 76 to engage the valve lever 55. At this time, further increase in applied pressure will have no effect upon the motor until the applied pressure is sufficient to overcome the initial tension of the follow-up spring 79. The action from this point on will be the same as described in detail for Figures 2 and 3.

While the damper motor is shown as controlling a single damper which varies the proportions of the fresh and return air, it will be understood that the motor may control a damper which controls the flow of fresh or return air only, or for actuating a pair of dampers, one of which controls the flow of fresh air and the other of which controls the flow of return air.

From the foregoing description, it will be apparent that this invention provides a simple and effective arrangement for controlling dampers in unit ventilators in a manner for accurately positioning the dampers in accordance with the demand of the controlling thermostat and which is readily adjustable so as to be applicable to different types of unit ventilators operating on different cycles of operation. While the invention is of special utility in air conditioning applications as described, certain features as defined in the appended claims are of broader application and relate to pneumatic control in general. Inasmuch as many modifications and applications of this invention will occur to those skilled in the art, it is desired to be limited only by the scope of the appended claims.

We claim as our invention:

1. In an air conditioning or ventilating system, in combination, a fresh air damper for controlling the flow of fresh air to a space, positioning motor means for positioning said damper, a controller for controlling said positioning motor means in a manner selectively to cause movement of said damper for increasing or decreasing the flow of air or for causing said damper to remain stationary, a pressure actuated device for actuating said controller, means for varying the pressure applied to said pressure actuated device in accordance with variations in a condition which said damper is controlled in accordance with, follow-up means actuated by changes in position of said damper for cooperating with said pressure actuated device in actuating said controller for varying the flow of air to said space in accordance with the pressure applied to said pressure actuated device, and means preventing actuation of said controller by changes in pressure applied to said pressure actuated device when the pressure applied to said pressure actuated device is between predetermined limits.

2. In an air conditioning or ventilating system, in combination, a fresh air damper for controlling the flow of fresh air to a space, positioning motor means for positioning said damper, a controller for controlling said positioning motor means in a manner selectively to cause movement of said damper for increasing or decreasing the flow of air or for causing said damper to remain stationary, a pressure actuated device for actuating said controller, means for varying the pressure applied to said pressure actuated device in accordance with variations in a condition which said damper is controlled in accordance with, follow-up means actuated by changes in position of said damper for cooperating with said pressure actuated device in actuating said controller for varying the flow of air to said space in accordance with the pressure applied to said pressure actuated device, means biasing said controller in a manner for causing movement of said damper to closed position, and lost motion means associated with said follow-up means for causing movement of said damper from closed position to a minimum flow position when the pressure applied to said pressure actuated device is such as to cause actuation of said controller against its biasing means.

3. In an air conditioning or ventilating system, in combination, a fresh air damper for controlling the flow of fresh air to a space, positioning motor means for positioning said damper, a controller for controlling said positioning motor means in a manner selectively to cause movement of said damper for increasing or decreasing the flow of air or for causing said damper to remain stationary, a pressure actuated device for actuating said controller, means for varying the pressure applied to said pressure actuated device in accordance with variations in a condition which said damper is controlled in accordance with, follow-up means actuated by changes in position of said damper for cooperating with said pressure actuated device in actuating said controller for varying the flow of air to said space in accordance with the pressure applied to said pressure actuated device, means biasing said controller in a manner for causing movement of said damper to closed position, lost motion means associated with said follow-up means for causing movement of said damper from closed position to a minimum flow position when the pressure applied to said pressure actuated device is such as to cause actuation of said controller against its biasing means, and means for preventing actuation of said controller by changes in pressure applied to said pressure actuated device when the pressure applied to said pressure actuated device is between predetermined values.

4. In an air conditioning or ventilating system, in combination, a fresh air damper for controlling the flow of fresh air to a space, positioning motor means for positioning said damper, a controller for controlling said positioning motor means in a manner selectively to cause movement of said damper for increasing or decreasing the flow of air or for causing said damper to remain stationary, a pressure actuated device for actuating said controller, means for varying the pressure applied to said pressure actuated device in accordance with variations in a condition which said damper is controlled in accordance with, follow-up means including a spring the stress of which is varied in accordance with the position of the damper for cooperating with said pressure actuated device in actuating said controller to thereby vary the flow of air in accordance with changes in pressure applied to said pressure actuated device, means biasing said controller in a manner for causing movement of said damper to closed position, lost motion means interposed in said follow-up means for causing movement of said damper from closed position to a minimum flow position when the pressure applied to said pressure actuated device is such as to cause actuation of said controller against its biasing means, and means for maintaining a predetermined initial stress on said follow-up spring to thereby cause said positioning motor means to remain stationary for changes in pressure applied to said pressure actuated device between predetermined limits.

5. In an air conditioning or ventilating system, in combination, a fresh air damper for controlling the flow of fresh air to a space, positioning motor means for positioning said damper, a controller for controlling said positioning motor means in a manner selectively to cause movement of said damper for increasing or decreasing the flow of air or for causing said damper to remain stationary, a pressure actuated device for actuating said controller, means for varying the pressure applied to said pressure actuated device in accordance with variations in a condition which said damper is controlled in accordance with, follow-up means including a spring the stress of which is varied in accordance with the position of the damper for cooperating with said pressure actuated device in actuating said controller to thereby vary the flow of air in accordance with changes in pressure applied to said pressure actuated device, means biasing said controller in a manner for causing movement of said damper to closed position, and lost motion means interposed in said follow-up means for causing movement of said damper from closed position to a minimum flow position when the pressure applied to said pressure actuated device is such as to cause actuation of said controller against its biasing means.

6. In an air conditioning or ventilation system, in combination, a fresh air damper for controlling the flow of fresh air to a space, a pressure actuated motor for positioning said damper, said motor including a lever, a first pivot for said lever, a diaphragm for moving said pivot through a predetermined path, said pivot being maintained in said path and being secured to said lever in a manner to prevent movement of the portion of the lever engaging said pivot from said path, said lever having also a normally fixed pivot, control valve means for controlling the supply and exhaust of fluid to and from said diaphragm, a pressure actuated device for actuating said control valve means, means for varying the pressure applied to said pressure actuated device in accordance with changes in a condition which said damper is controlled in accordance with, follow-up means actuated by changes in position of said damper for cooperating with said pressure actuated device in actuating said control valve means for varying the flow of air to said space in accordance with the pressure applied to said pressure actuated device, means for preventing actuation of said control valve means by changes in pressure applied to said pressure actuated device when the pressure applied to said pressure actuated device is between predetermined limits, and means for varying the damper movement for a given change in pressure applied to said pressure actuated device, said last mentioned means comprising a slot in said lever engaging said normally fixed pivot and adjustable means for varying the position of the normally fixed pivot longitudinally of said lever.

7. In an air conditioning or ventilation system, in combination, a fresh air damper for controlling the flow of fresh air to a space, a pressure actuated motor for positioning said damper, said motor including a lever, a first pivot for said lever, a diaphragm for moving said pivot through a predetermined path, said pivot being maintained in said path and being secured to said lever in a manner to prevent movement of the portion of the lever engaging said pivot from said path, said lever having also a normally fixed pivot, control valve means for controlling the supply and exhaust of fluid to and from said diaphragm, a pressure actuated device for actuating said control valve means, means for varying the pressure applied to said pressure actuated device in accordance with changes in a condition which said damper is controlled in accordance with, follow-up means actuated by changes in position of said damper for cooperating with said pressure actuated device in actuating said control valve means for varying the flow of air to said space in accordance with the pressure applied to said pressure actuated device, and means for varying the damper movement for a given change in pressure applied to said pressure actuated device, said last mentioned means comprising a slot in said lever engaging said normally fixed pivot and adjustable means for varying the position of the normally fixed pivot longitudinally of said lever.

8. In an air conditioning or ventilation system, in combination, a damper for controlling the flow of air, a pressure actuated motor for positioning said damper, said motor including a lever, a first pivot for said lever, a diaphragm for moving said pivot through a predetermined path, said pivot being maintained in said path and being secured to said lever in a manner to prevent movement of the portion of the lever engaging said pivot from said path, said lever having also a normally fixed pivot, control valve means for controlling the supply and exhaust of fluid to and from said diaphragm, means for actuating said control valve means including a device responsive to a condition which said damper is controlled in accordance with, and means for varying the damper movement for a given change in value of said condition, said last mentioned means comprising a slot in said lever engaging said normally fixed pivot and adjustable means for varying the position of the normally fixed pivot longitudinally of said lever.

9. In a system of the class described, in combination, a device to be controlled, positioning motor means for positioning said device, a controller for controlling said positioning motor means in a manner selectively to cause movement of said device in either direction or for causing said device to remain stationary, a pressure actuated device for actuating said controller, means for varying the pressure applied to said pressure actuated device in accordance with a condition, a first spring for biasing said pressure actuated device in one direction, a second spring adjusted by said positioning motor means for also biasing said pressure actuated device, a lost motion connection associated with said second spring for preventing said second spring from biasing said pressure actuated device when said positioning motor means is positioned within a predetermined range of movement, and means for placing a predetermined initial stress on said second spring.

10. In a system of the class described, in combination, a device to be controlled, positioning motor means for positioning said device, a controller for controlling said positioning motor means in a manner selectively to cause movement of said device in either direction or for causing said device to remain stationary, a pressure actuated device for actuating said controller, means for varying the pressure applied to said pressure actuated device in accordance with a condition, a first spring for biasing said pressure actuated device in one direction, said first spring being arranged so as to remain at substantially constant stress throughout a predetermined portion of the range of movement of said motor means, a second spring adjusted by said positioning motor means for also biasing said pressure actuated device, a lost motion connection associated with said second spring for preventing said second spring from biasing said pressure actuated device when said positioning motor means is positioned within a predetermined range of movement, and means for placing a predetermined initial stress on said second spring.

11. In a system of the class described, in combination, a device to be controlled, positioning motor means for positioning said device, a controller for controlling said positioning motor means in a manner selectively to cause movement of said device in either direction or for causing said device to remain stationary, a pressure actuated device for actuating said controller, means for varying the pressure applied to said pressure actuated device in accordance with a condition, a first spring for biasing said pressure actuated device in one direction, said first spring being adjusted by said positioning motor means, a second spring adjusted by said positioning motor means for also biasing said pressure actuated device, a lost motion connection associated with said second spring for preventing said second spring from biasing said pressure actuated device when said positioning motor means is positioned within a predetermined range of movement, and means for placing a predetermined initial stress on said second spring.

12. In a system of the class described, in combination, a device to be controlled, positioning motor means for positioning said device, a controller for controlling said positioning motor means in a manner selectively to cause movement of said device in either direction or for causing said device to remain stationary, a pressure actuated device for actuating said controller, means for varying the pressure applied to said pressure actuated device in accordance with a condition, a first spring for biasing said pressure actuated device in one direction, a second spring adjusted by said positioning motor means for also biasing said pressure actuated device, and a lost motion connection associated with said second spring for preventing said second spring from biasing said pressure actuated device when said positioning motor means is positioned within a predetermined range of movement.

13. In an air conditioning or ventilating system, in combination, a fresh air damper for controlling the flow of fresh air to a space, positioning motor means for positioning said damper, a controller for controlling said positioning motor means in a manner selectively to cause movement of said damper for increasing or decreasing the flow of air or for causing said damper to remain stationary, an adjustable device for actuating said controller, follow up means actuated by changes in position of the damper for cooperating with said adjustable device in positioning said controller for varying the flow of air to said space in accordance with the adjustment of said device, and means associated with the follow up means for preventing actuation of said controller by adjustment of said device within a predetermined portion of its range of adjustment which affects the position of the damper.

14. In an air conditioning or ventilating system, in combination, a fresh air damper for controlling the flow of fresh air to a space, positioning motor means for positioning said damper, a controller for controlling said positioning motor means in a manner selectively to cause movement of said damper for increasing or decreasing the flow of air or for causing said damper to remain stationary, an adjustable device for actuating said controller, follow up means actuated by changes in position of the damper for cooperating with said adjustable device in positioning said controller for varying the flow of air to said space in accordance with the adjustment of said device, and means for preventing actuation of said controller by adjustment of said device within a predetermined intermediate portion of its range of adjustment which affects the position of the damper to thereby cause the damper to maintain a predetermined flow of air when said device is adjusted within said portion of its adjustment range while causing movement of said damper when the device is adjusted outside of said portion of its range of adjustment.

15. In an air conditioning or ventilating system, in combination, a fresh air damper for controlling the flow of fresh air to a space, positioning motor means for positioning said damper, a controller for controlling said positioning motor means in a manner selectively to cause movement of said damper for increasing or decreasing the flow of air or for causing said damper to remain stationary, a pressure actuated device for actuating said controller, means for varying the pressure applied to said pressure actuated device in accordance with variations in a condition which said damper is controlled in accordance with, follow up means actuated by changes in position of said damper for cooperating with said pressure actuated device in actuating said controller for varying the flow of air to said space in accordance with the pressure applied to said pressure actuated device, means associated with said follow up means and said pressure actuated means to cause continued movement of said motor means from a closed position to an intermediate position when the pressure applied to the pressure actuated device is varied just sufficiently to cause movement of the motor from the closed position and means for preventing actuation of said controller by changes in pressure applied to said pressure actuated device between predetermined intermediate values when the motor means is in said predetermined intermediate position.

JOHN E. HAINES.
STANLEY W. NICKELLS.